Sept. 30, 1930. T. A. MARTIN 1,777,214
AUTOMOBILE LIFTING DEVICE
Filed June 3, 1927 3 Sheets-Sheet 1

INVENTOR
Thomas A. Martin
BY
his ATTORNEY

Sept. 30, 1930.  T. A. MARTIN  1,777,214
AUTOMOBILE LIFTING DEVICE
Filed June 3, 1927   3 Sheets-Sheet 2

INVENTOR
Thomas A. Martin
BY
his ATTORNEY

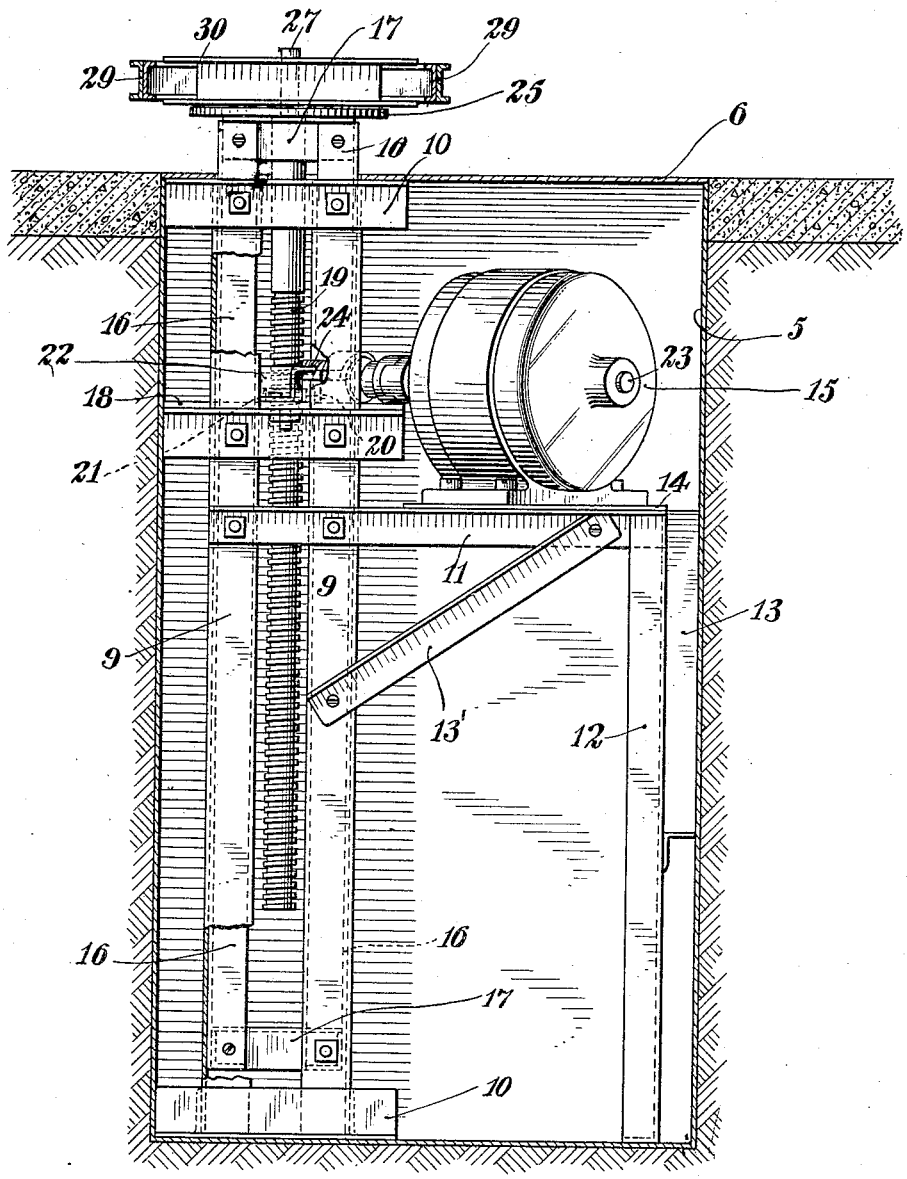

Patented Sept. 30, 1930

1,777,214

UNITED STATES PATENT OFFICE

THOMAS A. MARTIN, OF BRIDGEPORT, CONNECTICUT

AUTOMOBILE LIFTING DEVICE

Application filed June 3, 1927. Serial No. 196,165.

This invention relates to an improved automobile lifting device, and has for its primary object to provide a durably constructed motor operated means for bodily lifting or elevating a motor vehicle above the floor or ground surface to a convenient height so that mechanics may have easy access to the various parts beneath the body of the vehicle for the purpose of making necessary repairs thereto.

Heretofore, pits were constructed beneath the ground surface, having suitable tracks extending over the top thereof upon which the automobile is driven. The workmen or mechanics descend into these pits. Not only are such pit constructions comparatively expensive, but the ventilation is poor and artifical light must be used. I propose to provide a means for hoisting or lifting the motor vehicle above the ground surface which does not require elaborate excavation and which enables the mechanic to work above the ground surface with a maximum of natural light and air. In one embodiment of this improved hoisting mechanism, I provide an outer casing or housing adapted to be sunk into the ground and having a rigidly constructed guide means therein for a vertically sliding frame. Upon the upper end of this frame and above the ground surface spaced rigidly connected track rails upon which the vehicle is adapted to be driven are supported. A lifting screw is connected with the upper end of the frame, and suitable means is provided within the housing for supporting an operating motor driving a worm nut threaded upon said screw. This motor is of the reversible type so that by the operation of a suitable switch, the hoisting screw may be moved upwardly or downwardly to thereby raise or lower the vehicle.

It is also another object of the invention to provide a firm and substantial support for the track rails upon the upper end of the lifting frame and at the same time permit of said rails with the motor vehicle positioned thereon being turned about the axis of said frame so that the vehicle may be driven off of the rails in the desired direction.

With the above and other objects in view, the invention consists in the improved hoisting mechanism for motor vehicles and in the form, construction and relative arrangement of its several parts as will be hereinafter more fully described, illustrated in the accompanying drawings and subsequently incorporated in the subjoined claims.

In the drawings, wherein I have illustrated one simple and practical embodiment of the invention, and in which similar reference characters designate corresponding parts throughout the several views,—

Fig. 5 is a vertical sectional view taken substantially on the line 5—5 of Fig. 3.

Figure 1:
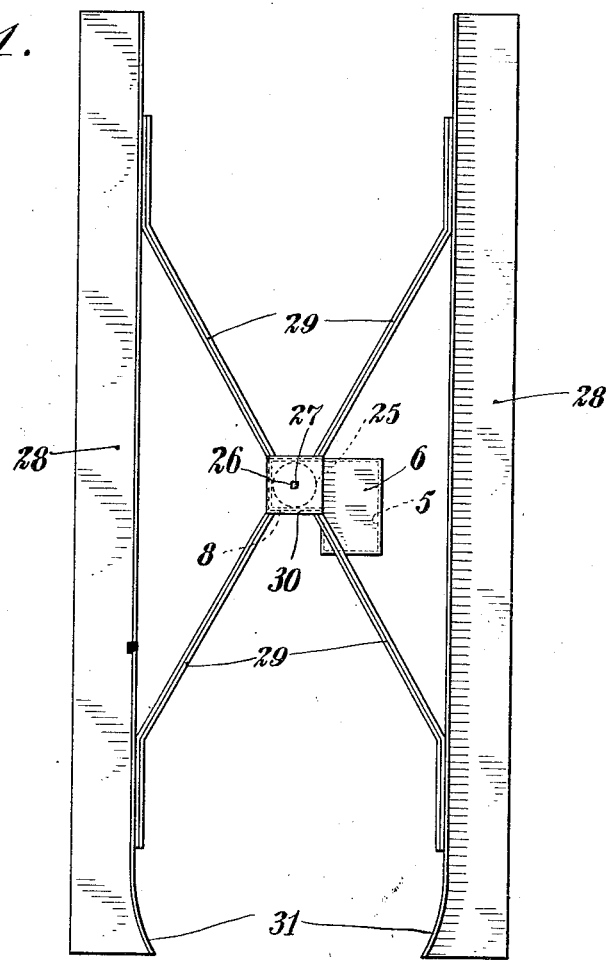
Figure 1 is a top plan view showing the track rails upon which the automobile is to be driven mounted upon the upper end of the hoisting frame.

Referring in detail to the drawings, 5 designates a substantially L-shaped casing of suitable dimensions which may be constructed from heavy sheet metal. The main section of this casing is provided with a removable cover plate 6. In the other laterally projecting section 8 of the casing 5, angle bar uprights or guide standards 9 are arranged at the corners of a parallelogram and are rigidly fixed at their lower ends and at suitably spaced intervals to the connecting bars 10. Intermediate of their ends, the relatively long horizontal angle bars 11 are rigidly fixed to the upright 9 and extend into the main section of the housing or casing 5 where they are rigidly fixed at their ends to the upper ends of the vertical angle bars 12 which are connected with each other by an obliquely disposed brace bar 13, one flange of which extends between the vertical angle bars 12 and the adjacent side wall of the housing or casing 5. The additional brace bars 13' also connect the horizontal bars 11 with certain of the uprights or standards 9. The horizontal bars 11 are connected to each other by means of a suitable platform 14 which supports a reversible electric motor 15.

A vertically slidable hoisting frame is arranged between the guide standards 9 and consists of angle bars 16 slidably engaged with the inner faces of the flanges of the respective guide bars 9, said angle bars 16 being rigidly connected with each other by the horizontal angle pieces 17 at their upper and lower ends. Upon the intermediate horizontal connecting bars 10 secured to the standards 9 a plate 18 is rigidly fixed and is provided with a central opening therein through which the hoisting screw 19 extends. A bearing disc 20 surrounds this screw and is secured upon the upper side of the plate 18, said disc being provided with suitable anti-friction bearing members in its upper surface upon which the worm nut 21 is supported, said nut having bearing engagement with the screw 19. A flanged sheet metal plate 22 extends over the nut 21 at one side of the screw 19 and is suitably fixed to the plate 18. The shaft 23 of the motor 15 is provided with a suitable worm 24 which is in constant mesh with the worm teeth on the periphery of the nut 21.

Upon the upper end of the vertically movable hoisting frame a disc 25 of suitable diameter is rigidly secured and is provided with a central rectangular opening therein to receive a squared section 26 of the hoisting screw 19, the upper end of said screw above said squared section being reduced in diameter and cylindrically formed as at 27.

As shown in Fig. 1, spaced track rails 28 of heavy angle metal are provided and rigidly connected with each other and braced by the bars 29 which diverge in opposite directions from a centrally positioned head 30. The vertical flanges of the track rails 28 at one of their ends are inwardly curved as shown at 31 to properly guide and direct the wheels of the motor vehicle as they are driven upon said rails. The head 30 is provided with a central opening therethrough to loosely receive the upper reduced end 27 of the hoisting screw 29. The under side of said head may be provided with suitable anti-friction members for engagement upon the upper surface of the disc 25 so as to permit of a comparatively free turning or rotative movement of the connected track rails 28 and the motor vehicle positioned thereon relative to the hoisting frame.

Figure 2:
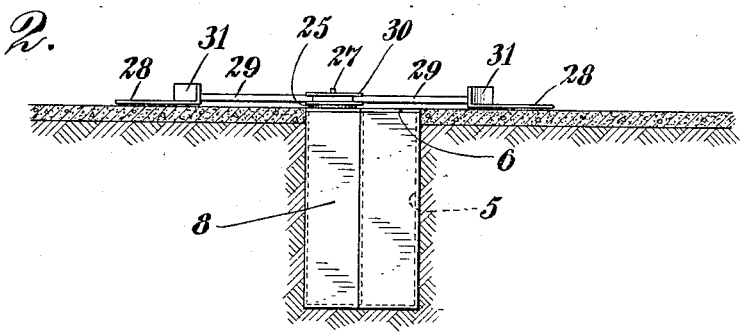
Fig. 2 is a side elevation showing the housing or casing for the hoisting mechanism sunk below the ground surface.
Figure 3:
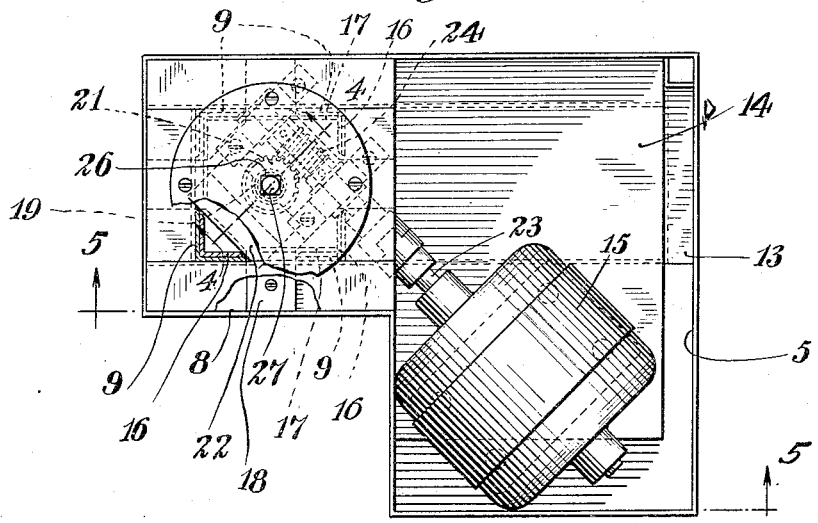
Fig. 3 is a top plan view, the cover of the casing or housing over the operating motor being removed and other parts shown in section.
Figure 4:
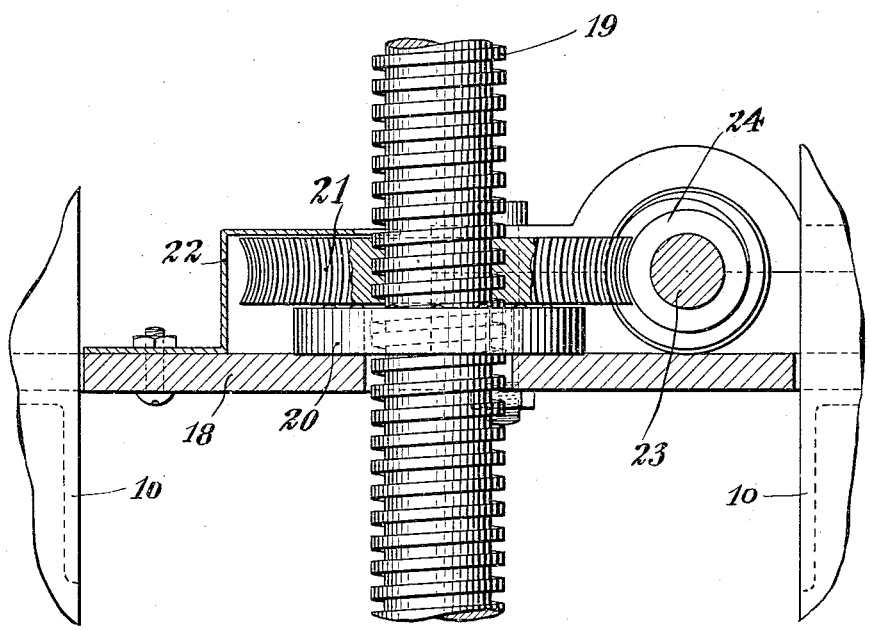
Fig. 4 is an enlarged detail vertical section taken on the line 4—4 of Fig. 3.

In the operation of the apparatus above described, normally the rails 28 are positioned with respect to the ground or floor surface as shown in Fig. 2 of the drawings. Since the head 30 connected with these rails may rotate freely upon the upper end of the hoisting screw 29, the entrance ends of the rails 28 can be readily disposed to receive the vehicle wheels approaching from any direction. After the vehicle has been driven into position with its front and rear wheels on the spaced track rails 28, the motor 15 is then operated by closing a suitable switch and through the medium of the worm 24 on the motor shaft the nut 21 is rotated in the proper direction to cause the screw 19 to be moved upwardly. Since the squared upper end portion of this screw is connected with the disc 25 fixed upon the upper ends of the vertically slidable frame bars 16, said disc and the frame will therefore, be raised or moved upwardly relative to the fixed guide standards 9 in the casing or housing 5. The operation of the motor is continued until the vehicle positioned on the supporting rails 28 is disposed at a sufficient elevation above the ground surface to enable the workman to move freely beneath the vehicle for the purpose of draining the oil from the crank case, or making necessary repairs to different parts of the mechanism which would be more or less difficult of access if the vehicle were not thus supported in a raised or elevated position. After the necessary work has been done, by closing another switch, the operation of the motor 15 is reversed so as to move the hoisting screw and the sliding frame connected therewith downwardly, and thus return the track rails to the position shown in Fig. 2 of the drawings. By then applying pressure against one side of the vehicle adjacent one end thereof, the vehicle and the track rails 28 may be readily turned so that the driver may drive the vehicle off of the track rails in a desired direction.

From the foregoing description considered in connection with the accompanying drawings, it will be seen that I have devised a durably constructed and relatively simple hoisting apparatus for motor vehicles, the major portion of which is disposed below the ground level, the several parts thereof being very compactly arranged so that relatively little excavation will be required. Such an apparatus for enabling the easy inspection and repair of motor vehicles, has the obvious advantage over the usual pit into which the workman descends beneath the vehicle, in that it enables the work to be done in the open air, and with the benefit of natural light. The initial cost of the apparatus and the expense incident to the installation thereof, is no greater than that required for the proper construction and installation of the repair pits now in more or less general use. In the foregoing description, I have particularly described a construction and arrangement of the hoisting frame and the supporting and guiding means therefor, but it will be understood that this is largely suggestive, and other constructions of this frame and the guide means as well as the arrangement of the operating motor might be employed. Also while the particular construction of the rails 28 and the connecting bars 29 between these rails and the head 30 has been found to be quite practical as access may be had to the various parts of the vehicle mechanism with little or no obstruction to the free movements of the workman, this part of the apparatus might also be produced in various other structural forms. Therefore, in the further development of the invention as herein described, it will be understood that the several essential parts thereof may be embodied in various other alternative structural forms, and I accordingly reserve the privilege of resorting to all such legitimate changes therein as may be fairly embodied within the spirit and scope of the invention as claimed.

I claim:

1. In a vehicle lifting apparatus, a casing adapted to be arranged in an excavation with its upper end flush with the ground surface, a guide frame rigidly secured within said casing and including spaced vertically extending angle bars, a lifting frame consisting of rigidly connected spaced angle bars slidably engaged with the respective angle bars of the guide frame and extending above the upper end of the casing, a disc fixed to the upper end of said lifting frame, a lifting screw having a rectangular upper end portion engaged in a rectangular opening in said disc, rigidly connected track rails rotatably supported upon said disc, a worm nut threaded on said lifting screw but restrained against longitudinal movement, a reversible operating motor mounted within said casing, and a worm on the motor shaft engaged with said worm nut.

2. In a vehicle lifting apparatus, a casing adapted to be arranged in an excavation with its upper end flush with the ground surface, a guide frame rigidly secured within said casing and including spaced vertically extending angle bars, a lifting frame consisting of rigidly connected spaced angle bars slidably engaged with the respective angle bars of the guide frame and extending above the upper end of the casing, a disc fixed to the upper end of said lifting frame, a lifting screw having a rectangular upper end portion engaged in a rectangular opening in said disc, rigidly connected track rails rotatably supported upon said disc, a worm nut threaded on said lifting screw but restrained against longitudinal movement, horizontally extending angle bars fixed to the guide frame bars intermediate of their ends and projecting laterally therefrom, vertical standards secured to the ends of said horizontal bars and extending between the same and the bottom wall of the casing, a platform secured to said horizontal bars, a reversible motor mounted on said platform, and a worm on the motor shaft engaged with said worm nut.

3. In a vehicle lifting device, a fixed guide frame including spaced vertically extending angle bars, a lifting frame reciprocable within said guide frame and including spaced angle bars slidably engaged with the respective spaced members of the guide frame, a trackway supported upon the lifting frame, and means for reciprocating said lifting frame.

4. In an auto lift, a load supporting member, a pair of spaced lifting members carrying said load supporting member, a motor for reciprocating said lifting members, a pair of spaced guide members adapted to receive the spaced lifting members and a vertical casing for said auto lift, substantially L shaped in horizontal section, and adapted to be arranged in an excavation with its upper end flush with the ground, the said spaced guide members being located in one arm of the L-shaped casing and the motor being located in the other arm of said casing.

5. In a vehicle lifting apparatus, a guide frame mounted in an excavation, with its upper end substantially on a level with the ground, a lifting frame slidably but non-rotatably mounted within the guide frame, a disc fixed at the upper end of the lifting frame, a lifting screw non-rotatably connected at its upper end to said disc, a load carrying platform rotatably mounted on said disc, a nut threaded on said lifting screw but restrained against longitudinal movement, and means for rotating said nut, whereby the load carrying platform is reciprocated.

6. In a vehicle lifting apparatus, a guide frame mounted in an excavation, with its upper end substantially on a level with the ground, a lifting frame slidably but non-rotatably mounted within the guide frame, a disc fixed at the upper end of the lifting frame, a lifting screw non-rotatably connected at its upper end to said disc, a load carrying platform rotatably mounted on said disc, a nut threaded on said lifting screw but restrained against longitudinal movement, and a reversible motor operatively connected to said nut for rotating the same.

7. A vehicle lifting device including a load carrying member, a fixed guide frame, and a lifting frame for said load carrying member, operatively connected thereto, and slidably but non-rotatably mounted in said guide frame, both said guide frame and said lifting frame comprising spaced angle bars, the angle bars of one frame telescoping within the corresponding angle bars of the other frame.

8. In a vehicle lifting apparatus, a fixed guide frame, a lifting frame slidably but non-rotatably mounted therein, and a load carrying member rotatably supported upon said lifting frame, a single lifting screw operatively connected at its upper end to said lifting frame, a nut threaded on said lifting screw but restrained against longitudinal movement, and means for rotating the nut, whereby the load carrying member is reciprocated.

9. In a vehicle lifting device, a fixed guide frame including spaced vertically extending angle bars, a lifting frame reciprocable within said guide frame and including spaced angle bars slidably engaged with the respective spaced members of the guide frame, a load carrying member rotatably supported upon the lifting frame, and means for reciprocating said lifting frame.

In testimony that I claim the foregoing as my invention, I have signed my name hereto.

THOMAS A. MARTIN.